R. W. DOUGLAS.
COUPLING FOR CABLES, &c.
APPLICATION FILED OCT. 12, 1914. RENEWED APR. 9, 1917.
1,243,493. Patented Oct. 16, 1917.
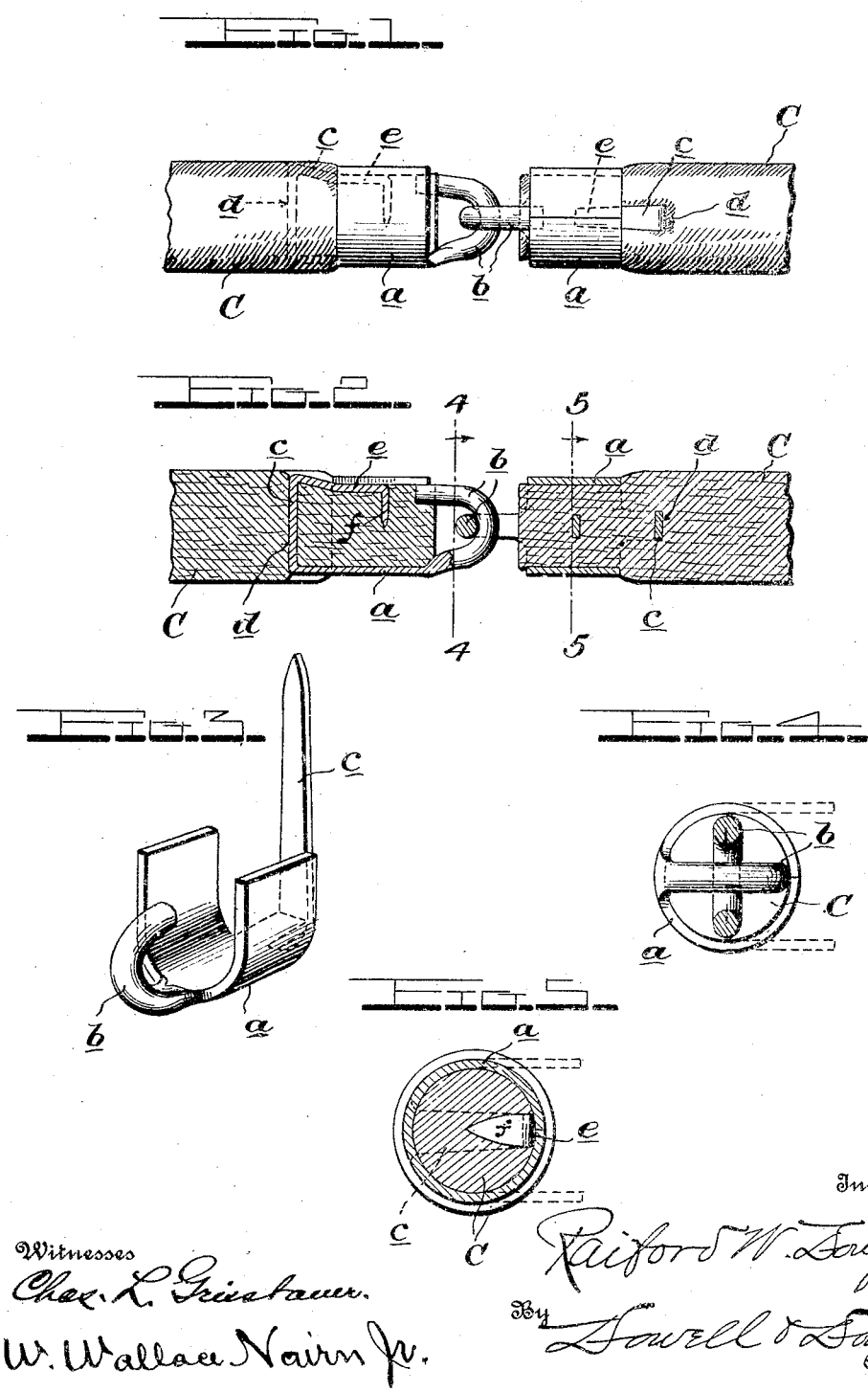

UNITED STATES PATENT OFFICE.

RAIFORD W. DOUGLAS, OF MIAMI, FLORIDA.

COUPLING FOR CABLES, &c.

1,243,493.          Specification of Letters Patent.          Patented Oct. 16, 1917.

Application filed October 12, 1914, Serial No. 866,300. Renewed April 9, 1917. Serial No. 160,885.

*To all whom it may concern:*

Be it known that I, RAIFORD W. DOUGLAS, a citizen of the United States, residing at Miami, in the county of Dade and State of Florida, have invented certain new and useful Improvements in Couplings for Cables, &c.; and I hereby declare that the following is a full, clear, and exact description thereof, reference being had to the accompanying drawings, which form part of this specification.

This invention is a novel coupling device for ropes, etc., being especially designed for connecting the cables of cash-carrying apparatus. The coupling can be readily attached to the ends of a cable or rope and will flexibly unite them, and permit them to traverse curves easily and quietly.

In the accompanying drawings—

Figure 1 is an enlarged side view of the coupling uniting adjacent ends of a cable or rope.

Fig. 2 is a longitudinal sectional view of Fig. 1.

Fig. 3 is a view of one of the coupling members before attachment.

Fig. 4 is an enlarged transverse section on line 4—4, Fig. 2; and

Fig. 5 is a similar enlarged section on line 5—5, Fig. 2.

The complete coupling embodies two similar members attached to adjacent ends of the cables to be connected. Each member is preferably composed of a body portion $a$ adapted to clamp the cable end, and having a front projection $b$ bent to form an eye engaging the corresponding eye on the opposed member; and having a rear tang portion $c$ adapted to securely fasten the member to the cable end.

As shown in Fig. 3 each body portion $a$ before attachment is substantially rectangular and is bent into U-shape, and the tang $c$ projects from the center and rear edge of this body portion and is long and narrow and preferably pointed at its extremity and bent at right angles to the body portion.

To apply such a member to a cable end, the tang $c$ is forced through the cable near its end, (as indicated at $d$ in Fig. 2,) until the body presses against the cable; the tang is then bent forward and over the end of the cable and between the ends of the body portion (as at $e$ in Fig. 2) and its extremity is bent inwardly and embedded in the cable (as at $f$ in Figs. 2 and 5), the point of the shank being concealed and protected by the body portion when closed around the cable end.

The ends of the U-shaped body portion are then closed around the cable end and over the underlying part $e$ of the shank (see Figs. 2 and 5,) thus tightly clamping the member to the cable end and preventing the cable end unraveling. The member is thus securely held against longitudinal movement on the cable; and the point of the tang being confined within the body is prevented from catching external objects, and it prevents the tang loosening under strain. The eye portion $b$ of the member is preferably rounded in cross section, so that when it is engaged with the eye portion $b$ of the adjacent clamp member (Figs. 1 and 2,) they will have sufficient free play in relation to each other to render the cable flexible and permit the coupling to readily follow curves.

What I claim is:

1. A coupling member comprising a body portion adapted to be bent around a cable end to clamp same, and having an integral part on its front end bent to form an eye and also having an integral tang on its rear end, said tang when the coupling is applied transfixing the cable, the projecting end of the tang extending forward and inclosed within the part of the body bent around the cable end, substantially as described.

2. A coupling member comprising a body portion bent around the cable end to clamp the same, said body portion having a part on its front end bent to form an eye the free extremity of said part extending back into the bent body portion to close the eye, said body portion also having a tang projecting from its rear end transfixing the cable in rear of the body portion and bent forward against the cable and having its end confined within the body portion, substantially as described.

In testimony that I claim the foregoing as my own, I affix my signature in presence of two witnesses.

RAIFORD W. DOUGLAS.

Witnesses:
    C. A. NIGHTINGALE,
    H. C. BUDG.